US009244732B2

(12) United States Patent
West et al.

(10) Patent No.: US 9,244,732 B2
(45) Date of Patent: Jan. 26, 2016

(54) COMPENSATING THREADS FOR MICROARCHITECTURAL RESOURCE CONTENTIONS BY PRIORITIZING SCHEDULING AND EXECUTION

(75) Inventors: Richard West, Easton, MA (US); Puneet Zaroo, Santa Clara, CA (US); Carl A. Waldspurger, Palo Alto, CA (US); Xiao Zhang, Rochester, NY (US)

(73) Assignee: VMware, Inc., Palo Alto, CA (US)

( * ) Notice: Subject to any disclaimer, the term of this patent is extended or adjusted under 35 U.S.C. 154(b) by 1841 days.

(21) Appl. No.: 12/550,193

(22) Filed: Aug. 28, 2009

(65) Prior Publication Data

US 2011/0055479 A1    Mar. 3, 2011

(51) Int. Cl.
*G06F 9/48* (2006.01)
*G06F 11/34* (2006.01)
*G06F 12/08* (2006.01)

(52) U.S. Cl.
CPC ............... *G06F 9/4881* (2013.01); *G06F 9/48* (2013.01); *G06F 11/3409* (2013.01); *G06F 12/0842* (2013.01); *G06F 2209/485* (2013.01); *G06F 2209/486* (2013.01)

(58) Field of Classification Search
None
See application file for complete search history.

(56) References Cited

U.S. PATENT DOCUMENTS

| | | | | |
|---|---|---|---|---|
| 5,072,376 A * | 12/1991 | Ellsworth | ............ | G06F 11/3423 713/502 |
| 6,430,654 B1 * | 8/2002 | Mehrotra | ............ | G06F 12/0859 711/118 |
| 6,584,488 B1 * | 6/2003 | Brenner | ................ | G06F 9/5011 718/103 |
| 6,697,834 B1 * | 2/2004 | Dice | ............................ | 718/102 |
| 7,363,450 B1 * | 4/2008 | Fedorova | .............. | G06F 9/4881 711/118 |
| 7,457,931 B1 * | 11/2008 | Fedorova | ............ | G06F 11/3419 711/118 |
| 7,707,578 B1 * | 4/2010 | Zedlewski | ............ | G06F 9/5027 712/215 |
| 8,028,286 B2 * | 9/2011 | Fedorova | .............. | G06F 9/4881 718/102 |
| 8,065,459 B2 * | 11/2011 | Bekooij | ........................ | 710/244 |
| 2005/0081183 A1 * | 4/2005 | Accapadi | .............. | G06F 9/5083 717/100 |
| 2005/0166204 A1 * | 7/2005 | Takatsu | ............... | G06F 11/3466 718/100 |
| 2005/0229176 A1 * | 10/2005 | Findeisen | ........... | G06F 11/3423 718/100 |
| 2006/0168571 A1 * | 7/2006 | Ghiasi et al. | ................... | 717/127 |
| 2007/0064711 A1 * | 3/2007 | Wang et al. | ................ | 370/395.4 |

(Continued)

FOREIGN PATENT DOCUMENTS

WO    WO 2007132424 A2 * 11/2007

OTHER PUBLICATIONS

Mutlu et al., Stall-Time Fair Memory Access Scheduling for Chip Multiprocessors, 40th IEEE/ACM International Symposium on Microarchitecture (2007).*

*Primary Examiner* — Adam Lee
*Assistant Examiner* — Benjamin Wu
(74) *Attorney, Agent, or Firm* — Leonard Heyman (57) ABSTRACT

A thread (or other resource consumer) is compensated for contention for system resources in a computer system having at least one processor core, a last level cache (LLC), and a main memory. In one embodiment, at each descheduling event of the thread following an execution interval, an effective CPU time is determined. The execution interval is a period of time during which the thread is being executed on the central processing unit (CPU) between scheduling events. The effective CPU time is a portion of the execution interval that excludes delays caused by contention for microarchitectural resources, such as time spent repopulating lines from the LLC that were evicted by other threads. The thread may be compensated for microarchitectural contention by increasing its scheduling priority based on the effective CPU time.

28 Claims, 5 Drawing Sheets

(56) References Cited

U.S. PATENT DOCUMENTS

| | | | |
|---|---|---|---|
| 2007/0248100 A1* | 10/2007 | Zuberi et al. | 370/395.41 |
| 2008/0022280 A1* | 1/2008 | Cherkasova | G06F 9/4881 |
| | | | 718/102 |
| 2008/0059712 A1* | 3/2008 | Fedorova | G06F 9/4881 |
| | | | 711/130 |
| 2008/0104610 A1* | 5/2008 | Norton | G06F 11/3419 |
| | | | 718/108 |
| 2008/0134184 A1* | 6/2008 | Fedorova | G06F 9/4881 |
| | | | 718/102 |
| 2008/0134185 A1* | 6/2008 | Fedorova | 718/102 |
| 2008/0155233 A1* | 6/2008 | Ward | G06F 9/4818 |
| | | | 712/220 |
| 2008/0201591 A1* | 8/2008 | Hu et al. | 713/323 |
| 2008/0235457 A1* | 9/2008 | Hasenplaugh | G06F 12/0842 |
| | | | 711/130 |
| 2008/0244215 A1* | 10/2008 | Flemming | G06F 9/5077 |
| | | | 711/173 |
| 2009/0031314 A1* | 1/2009 | Moscibroda | G06F 9/52 |
| | | | 718/102 |
| 2009/0044189 A1* | 2/2009 | Mutlu | G06F 9/4881 |
| | | | 718/102 |
| 2009/0055580 A1* | 2/2009 | Moscibroda | G06F 13/1642 |
| | | | 711/104 |
| 2009/0138670 A1* | 5/2009 | Mutlu | G06F 13/1663 |
| | | | 711/167 |
| 2009/0138683 A1* | 5/2009 | Capps et al. | 712/220 |
| 2009/0172686 A1* | 7/2009 | Chen | G06F 9/4881 |
| | | | 718/103 |
| 2009/0217273 A1* | 8/2009 | Mutlu | G06F 9/4881 |
| | | | 718/101 |
| 2010/0031254 A1* | 2/2010 | Chin et al. | 718/1 |

* cited by examiner

COMPENSATING THREADS FOR MICROARCHITECTURAL RESOURCE CONTENTIONS BY PRIORITIZING SCHEDULING AND EXECUTION

BACKGROUND

Modern symmetric microprocessor systems (SMP) incorporate multiple processor cores sharing a last-level memory cache (LLC). A cache is a high-speed data storage area adjacent the processor core for storing a copy of recently accessed or frequently accessed data that is otherwise stored in the main memory system of a computer. The term "processor core" is used herein to indicate an execution engine that may coexist with other cores on a single die. In modern multi-core processors, each core often has one or two levels of its own cache, and shares a second- or third-level cache (the LLC) with one or more other cores on the same die. However, there are also processors with multiple cores on separate dies that share an LLC on the main mother board or within a processor package. Having more than one core allows for more than one thread to execute concurrently on a single computer system (and not just time-wise interleaved).

When a thread that is executing on one core of a processor fetches data, it first checks local cache to see if the data is already present in the cache. When there are multiple levels of cache, the checks percolate through to the LLC if the earlier caches do not have the requested data. If the requested data is not in the LLC (an LLC "cache miss") then the data is fetched from main memory, and a line is evicted from the LLC so that the newly-fetched data can be made available in the LLC in case it is needed again. When the LLC is shared by a plurality of processor cores, the data that was evicted can either have been placed there by the same thread whose memory request resulted in the eviction, or it can have been placed there by a different thread, possibly running on a different core. As a result, the execution of one thread on one core can adversely affect the execution of other threads running on the same or other cores that share the same LLC.

CPU resources are generally allocated to a plurality of concurrently running threads that may execute interleaved on a single core or simultaneously on a plurality of different cores, or both. There are many existing scheduling algorithms in use, which generally attempt to provide some "fair" distribution of processor resources to each of the executing threads. In some cases, a CPU scheduling algorithm may take into consideration a "proportional share" of the scheduling resources, such that some processes are granted a greater than even share of processor resources. In a proportional fair scheduling policy, for example, a first thread may be given a proportional share of 800, and a second thread given a proportional share of 400, so that the ratio between the two is 2:1, and the first thread is given twice the resources (i.e., CPU execution time) of the second.

Contention for LLC and other microarchitectural resources can adversely impact the fair distribution of processor resources among threads. Microarchitecture refers to a physical implementation of an instruction set architecture in a computer system. Microarchitectural resources include the physical resources such as the cache, memory interconnects, and functional units. Contention for these resources result in delays in useful execution by one thread imposed by another thread. For example, because the execution of a first thread on a first core can interfere with data stored in the LLC that is shared with a second thread, and because a cache miss imparts a significant penalty in terms of the time it takes to fetch the data from the main memory, the presence of a shared LLC can cause delays in execution by the second thread caused by the first thread.

SUMMARY

A thread (or other resource consumer) is compensated for contention for system resources in a computer system having at least one processor core, a last level cache (LLC), and a main memory. In one embodiment, at each descheduling event of the thread following an execution interval, an effective CPU time is determined. The execution interval is a period of time during which the thread is being executed on the central processing unit (CPU) between scheduling events. The effective CPU time is a portion of the execution interval that excludes delays caused by contention for microarchitectural resources, such as time spent repopulating lines from the LLC that were evicted by other threads. The thread is compensated for delays caused by microarchitectural contention by increasing its scheduling priority (or decreasing other threads' priorities) based in part on the effective CPU time.

DETAILED DESCRIPTION

Figure 1:
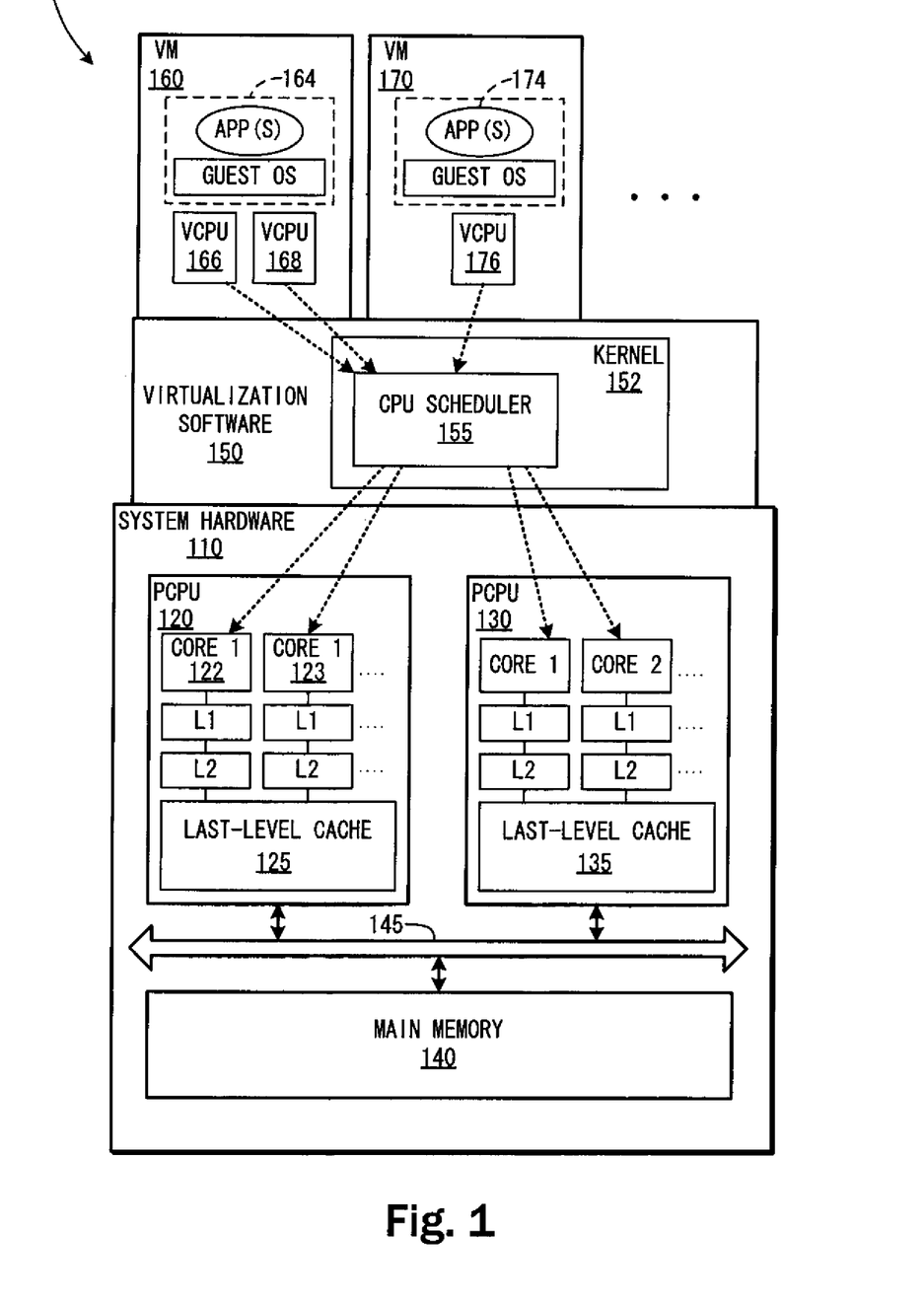
FIG. 1 shows a virtualized computer system having a CPU scheduler.

FIG. 1 shows a virtualized computer system 100. Computer system 100 includes a hardware system 110 having one or more physical central processing units (PCPUs) 120, 130, each having a plurality of cores. PCPU 120 has a first core 122 and a second core 123, with several levels of cache, including a last-level cache (LLC) 125, which is shared between cores 122,123 of PCPU 120. Although the example system shown in FIG. 1 represents the LLC as being a level 3 (L3) cache, it should be noted that in some processor architectures, the L2 cache is the last level shared cache. PCPU 130 likewise has a plurality of processor cores and a shared LLC 135. PCPUs 120, 130, are connected to a main memory system 140 via a memory interconnect 145. Main memory 140 may comprise a system of memories, including volatile and nonvolatile memory, and can include uniform memory or non-uniform memory accesses (NUMA); the term "memory interconnect" referring to any communication paths for accessing memory.

System hardware 110 will include many components aside from those specifically mentioned here, and such omissions are for the purpose of not obscuring important elements of system 100 and should therefore should not be construed as being limiting in any way. For example, PCPUs 120, 130, main memory 140, and memory interconnect 145, may be just one node in a system with additional nodes (not shown) forming a non-uniform memory access (NUMA) based architecture. NUMA architecture is well known in the field of computer science. In such systems, a plurality of nodes each having one or more processors, local memory, and local input/output channels, are connected together so that they can read each other's memory and update each other's cache to ensure cache-coherency. It is referred to as "non-uniform" because it takes less time for an intra-node memory access (i.e., a processor accessing local memory) than it takes for an inter-node memory access (i.e., a processor accessing a remote memory).

In the example presented by system 100, virtualization software 150 is executing on system hardware 110, as shown conceptually in the diagram of FIG. 1. Of course, virtualization software 150 may reside in main memory 140, but is shown conceptually in FIG. 1 as running "on top of" system hardware 110. Virtualization software 150 may comprise a plurality of software layers including a kernel 152, which manages the hardware resources of system hardware 110, and an instance of a virtual machine monitor (VMM, not shown) for each virtual machine (VM), which emulates hardware resources for the virtual machines. Kernel 152 includes CPU scheduler 155 for prioritizing and dispatching execution threads to cores 122, 123, etc. Virtualization software 150 enables execution of a plurality of virtual machines 160, 170, etc., in a well-understood manner.

Each virtual machine 160, 170 is an abstraction of a physical computer system, having virtual hardware including one or more virtual central processor units (VCPUs) 166, 168, 176, etc. In addition, each VM includes guest system software 164, 174, which includes a guest operating system and one or more applications. The guest operating system may be a commodity operating system such as Windows®, Linux®, etc., or a specialized operating system. In either case, the guest operating system includes a kernel (not shown) that, among other tasks, assigns processes, such as ones associated with the guest applications, to the VCPUs that are conceptually part of that virtual machine but are implemented by virtualization software 150. Instructions executing on VCPUs 166, 168, 176 may in fact be directly executed on PCPUs 120, 130, but under the direction and control of virtualization software 150. In one embodiment, the VMMs (not shown) include a thread mapped to each VCPU in the corresponding virtual machine, which is assigned by CPU scheduler 155 to one of the cores of PCPUs 120, 130. In addition to the VMM threads, the CPU scheduler assigns threads corresponding to kernel 152 itself, so that kernel 152 can carry out its own tasks. CPU scheduler 155 distributes hardware resources, including PCPU time to each thread corresponding to each VCPU, and to any threads running within virtualization software 150.

Figure 2:
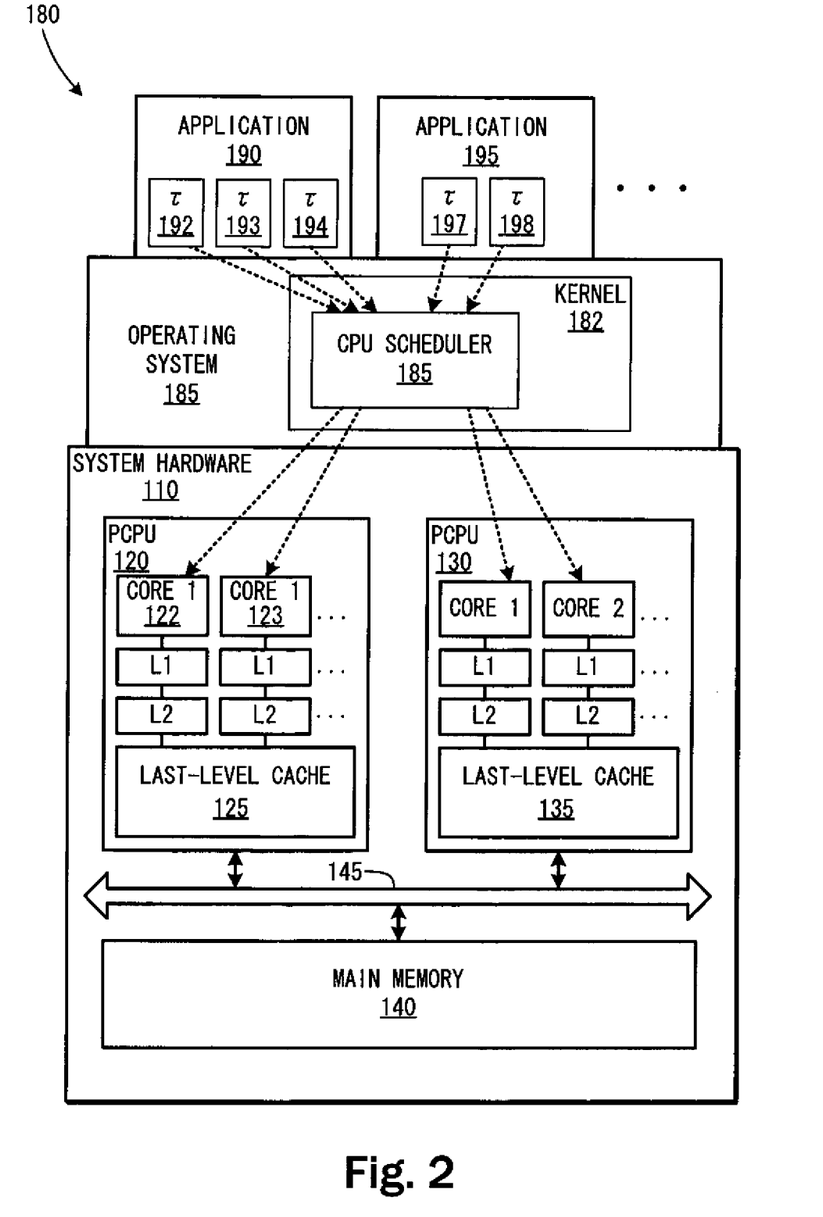
FIG. 2 shows a computer system having a traditional operating system executing directly on the system hardware having a CPU scheduler.

FIG. 2 shows a system 180 having a system hardware 110 as described above with reference to FIG. 1, but with traditional operating system 185 executing thereon as shown conceptually in FIG. 2 by positioning operating system 185 on system hardware 110. Operating system 185 includes a kernel 182 for managing physical system hardware 110, and other components and modules (not shown) providing an execution environment, as generally known in the field of operating system development, for executing applications 190, 195, etc. Each application 190, 195 can have one or more threads 192, 193, 194, 197, 198, etc., that are assigned by CPU scheduler 185 to one or more cores 122, 123, etc., of system hardware 110.

In one embodiment, CPU scheduler 155 (FIG. 1) or 185 manages PCPU cycles according to a generalized processor sharing (GPS) model. With GPS, each thread appears to execute on its own dedicated processor at a rate proportional to a value given by the thread's assigned weight divided by the sum of all the weights of all the threads. Thus, the greater the assigned weight for the thread relative to weights of other threads, the faster it executes relative to other threads in the system. This is considered a "proportional fair" system since the hardware resource is fairly distributed proportionally to the assigned weights. The CPU scheduler then determines which thread should be scheduled next based on which has not had its fair share of the processor resources based on its assigned weight.

Threads may execute until blocked or preemptively descheduled by CPU scheduler 155, 185. Threads may block, e.g., when an input/output or event request is issued and execution cannot continue until the needed data is retrieved or some other event needs to complete. In virtualized computer systems such as that described above with reference to FIG. 1, the CPU scheduler 155 may deschedule a thread corresponding to a VCPU if it detects that the guest OS managing the VCPU is in an idle loop. By way of example, U.S. patent application Ser. No. 10/871,922, filed Jun. 18, 2004 and incorporated herein by reference, presents an embodiment for idle loop detection in guest operating systems.

The weight is an arbitrary number assigned to each thread. In one embodiment, the number is taken or derived from values given to processes, applications, virtual machines, or other software execution entities or abstractions, by an administrator or user of the computer system. For example, an administrator may decide that VM 160 (FIG. 1) is more important than VM 170, and should therefore be given three times the resources of VM 170. The administrator/user may therefore assign a weight of 120 to VM 160 and a weight of 40 to VM 170, or any pair of numbers having a 3:1 ratio. In one embodiment, the weight of 120 assigned to VM 160 is divided evenly among each VCPU 166, 168, so that each of the two VCPUs in VM 160 inherits half of the assigned weight of 120—, i.e., a weight of 60. The virtualization software then takes the two threads created by the VMM (not shown) for VM 160, one thread for each VCPU, and assigns PCPU time according to the weight of 60. VM 170, having a single VCPU and an assigned weight of 40, will have a thread corresponding to VCPU 176 with a weight of 40. CPU scheduler 155 therefore assigns threads for VCPUs 166, 168, and 176 to available PCPU cores according to the ratio 60:60:40, respectively.

In another embodiment, a weight or resource share is assigned to each VM without dividing the resource between the VM's VCPUs in a predetermined manner. In this embodiment, the consumption of PCPU execution time consumed by each VM is tracked as a total of its constituent VCPU resource consumption. Therefore, if one of the VCPUs idles in the VM, the share of PCPU resources allocated to that VM flows to the running VCPUs.

In practice, GPS can only be approximated as there are typically fewer processing cores than threads, and each core is time shared at some discrete granularity of time (e.g., several of milliseconds). The principles of the GPS model are well known in the art of computer resource scheduling.

Common to many "proportional fair," e.g., "weighted fair queuing" (WFQ) scheduling algorithms is the notion of virtual time. A thread's virtual time increases in proportion to real time based on (i.e., as a function of) the weight assigned the particular thread such that:

$$v'=v+q/w \qquad \text{(Eq. 1)}$$

where v' is the updated virtual time for a particular thread at real time t, v is the current virtual time for that thread before being updated, q is the actual time spent by that thread using a resource, and w is the weight for that thread. The actual time spent by the thread may be determined by PCPU execution time since the last update to v(t) for the thread. By prioritizing clients with lower virtual times, i.e., by scheduling them first, proportional-fair schedulers favor clients with higher weights. More precisely, the threads' CPU usage ratios match (or approximate) their relative weights when the system is overcommitted, i.e., the threads are fully backlogged.

Figure 3:
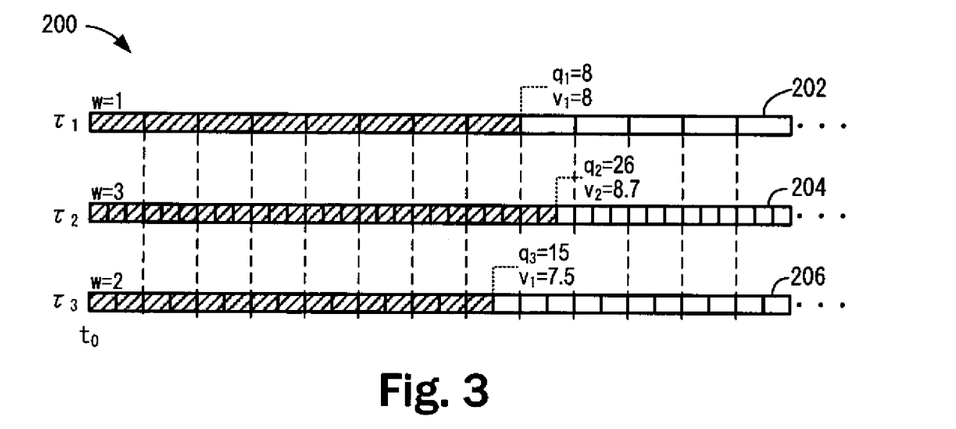
FIG. 3 shows a set of virtual time lines for illustrating the concept of virtual time.

FIG. 3 illustrates the concept of virtual time using timelines 200. Three time lines 202, 204, and 206 are provided for three threads, $\tau_1$, $\tau_2$, and $\tau_3$, respectively. Although only three threads are shown, it can be assumed that many other threads are executing concurrently with the three shown. Each time line measures virtual time for each of the corresponding threads, and is broken up into segments, each segment representing one millisecond of real time. Because virtual time varies from one thread to another according to their assigned weights, a millisecond of real time translates to less virtual time for threads given greater weights than for threads smaller weights.

For example, FIG. 3 shows thread $\tau_1$ having a weight of 1, thread $\tau_2$ having a weight of 3, and thread $\tau_3$ having a weight of 2. At an initial time $t_0$, none of the threads have run for any amount of time and so their virtual time equals zero. For the sake of this illustration, suppose thread $\tau_1$ executes for 8 milliseconds from time $t_0$ and is then blocked or is preemptively descheduled 8 milliseconds later so that $q_1$=8 milliseconds. The CPU scheduler then schedules thread $\tau_2$, which runs for 26 milliseconds of real time before being blocked or otherwise descheduled, so that $q_2$ now equals 26 milliseconds. Applying Equation 1 to thread $\tau_2$ gives: $v_2'$=0+26/3=8.7. As can be seen, virtual time accumulates slower for threads with higher weights. When thread $\tau_3$ executes, it lasts for 15 milliseconds ($q_3$=15) before being blocked and its new virtual time is calculated as 7.5 because it has a weight of 2. At this point, although thread $\tau_3$ has executed nearly twice as long as thread $\tau_1$, it has a smaller virtual time, and should therefore be next in line to execute (assuming it becomes unblocked before its turn comes again). In one embodiment, integers are used to represent fixed-point numbers, e.g., by pre-multiplying all values by 2 to the $20^{th}$ power (1,048,576), and truncating the remainders.

PCPU resources may be divided among threads, or any higher level abstraction, including processes, applications, VCPUs, virtual machines, users, and groups. Each thread or higher-level abstraction may be referred to as a "resource consumer." In one embodiment, resource shares are assigned to individual VMs running concurrently on a particular system. In this case, each VM has its virtual time stamp updated whenever any of its constituent VCPUs consumes PCPU time. Thus, when one VCPU idles in a guest VM, remaining VCPUs can consume the VM's full allocation of PCPU resources. Although the discussion following relates specifically to threads for clarity, it should be understood that the resource management algorithms described herein may be applied to any resource consumer at any level of abstraction.

Other proportional fair algorithms are known that do not rely on a notion of virtual time. One example is referred to as Lottery Scheduling, which is described by Carl A. Waldspurger and William E. Weihl in their paper entitled "Lottery Scheduling: Flexible Proportional-Share Resource Management" presented in the Proceedings of the First Symposium on Operating Systems Design and Implementation (OSDI '94) pages 1-11, Monterey, Calif., November 1994, which is incorporated herein by reference. In this approach, resource rights are represented by lottery tickets, and each allocation is determined by holding a lottery, in which the resource is granted to the client with the winning ticket, picked at random. The resource is therefore, in the aggregate, allocated among competing clients in proportion to the number of tickets that they hold.

The execution of a thread $\tau_1$ on one core of a given PCPU may interfere with data stored in the LLC for another thread $\tau_2$ executing on the same or another core of the same PCPU. That is, cache misses seen by $\tau_1$ result in memory accesses to populate the LLC with the necessary lines of data. Since the LLC is shared among all threads that execute on any of the PCPU's cores, cache misses by one thread may cause data stored by other threads to be evicted, which will result in further misses by the other threads sharing the same LLC. Therefore, if one thread is performing a memory-intensive task, it may unfairly utilize more than its fair share of the cache, causing other threads to spend an inordinate amount of time fetching data from the main memory that was evicted from the LLC by the thread performing the memory intensive task. This causes the progress of the other threads to suffer at the expense of the one thread, since a significant amount of their time is spent performing time-consuming memory accesses, which only happen because of the one thread's memory-intensive activity.

To account for this unfairness, an "effective CPU time" may be calculated, which is the portion of the execution interval that is not spent being delayed by microarchitectural contention, e.g., by repopulating cache lines evicted from the LLC by other threads. In one embodiment, the effective CPU time can be estimated by computing:

$$e=q-C \qquad (Eq. 2)$$

where e is the effective CPU time during the most recent execution interval, q is the total execution time of the most recent interval, and C is the total delay caused by contention for microarchitectural resources, such as time spent repopulating cache lines in the LLC that were evicted by other threads or waiting for a queued memory access request to be dispatched. Once the effective CPU time is known, it can be used in place of the actual CPU time q in Equation 1 to give:

$$v'=v+e/w \qquad (Eq. 3)$$

In Equation 3, the thread is compensated for time spent repopulating evicted cache lines by updating the virtual time stamp based on the effective CPU time rather than actual CPU time. In a proportional fair allocation scheme based on virtual time, this compensation will result in a grant to the thread of sufficiently more CPU time to account for time required to repopulate the LLC lines evicted by other threads. Thus, the victim thread, i.e., the thread that had its cache lines evicted by other threads, is compensated by granting the victim additional CPU time at the expense of the offending threads.

It is also possible, in another embodiment, to directly penalize offending threads by taking away CPU time by an estimated amount of their contribution. In this embodiment, $$e=q+P, \qquad (Eq. 4)$$

where P is the delay inflicted on other threads by the offending thread. In this case, the effective time of the offending thread's execution is artificially increased by the penalty amount P. Calculation methods for C and P are described below.

In other allocation schemes, the victim thread can be similarly compensated. For example, in the lottery scheduling scheme described above, the thread may be granted compensation tickets to increase its share of resources by an amount based on the effective CPU time.

Figure 4:
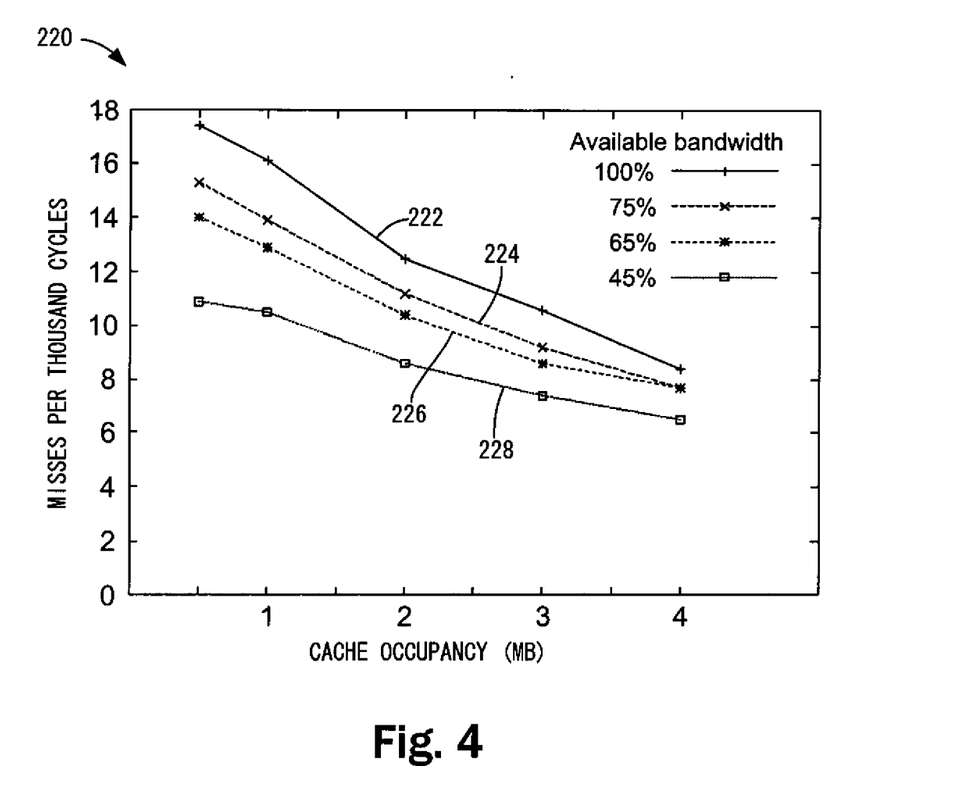
FIG. 4 shows a graph having a series of miss rate curves reflecting by way of example the impact of available bandwidth on the relationship between thread occupancy of a last-level cache and miss rate.

FIG. 4 shows a graph 220 having miss rate curves (MRC) 222, 224, 226, 228 that reflect by way of example the impact of available bandwidth on the relationship between thread occupancy of the LLC and the miss rate. Miss rate curve 222 reflects the average number of cache misses per clock cycle as a function of LLC occupancy when there is no memory interconnect contention, i.e., when the memory interconnect is 100% available. As would be expected, there are more cache misses at low levels of LLC occupancy than at higher levels of LLC occupancy. However, this curve can get flattened out as shown by MRCs 224, 226, and 228 when memory interconnect contention becomes an issue. Referring to FIG. 1, memory interconnect 145 may serve multiple PCPUs each possibly having multiple processor cores, all of which continually access main memory 140. Due to the nature of memory interconnect 145, only one request can be serviced at a time. Therefore, memory accesses may queue, causing a reduction in the number of instructions per cycle that can be processed when LLC misses occur. Referring back to FIG. 4, the impact of memory interconnect contention can cause a flattening of MRC 222, as shown by MRCs 224, 226, 228 due to the reduced instructions per cycle that can be executed when memory access requests are queued by the memory interconnect controller. That is, when a greater percentage of instructions require a memory access due to reduced cache occupancy, and the memory accesses are further delayed due to memory interconnect contention, the rate of instruction processing as a whole is greatly reduced which also reduces the miss rate as expressed in terms of misses per unit time.

U.S. patent application Ser. No. 12/251,108, filed by West et al. on Oct. 14, 2008, entitled, "Online Computation of Cache Occupancy and Performance" (referred to hereinafter as "the '108 application") and which is incorporated herein by reference in its entirety, describes a statistical model for estimating per-thread LLC occupancy, in terms of the number of cache lines. This model leverages hardware performance counters to obtain the number of cache misses for the local thread whose occupancy is being estimated and the number of misses for all other co-running threads sharing the same cache.

Each thread can be assumed to have a corresponding MRC that reflects the current miss rate of the thread as a function of its occupancy. The '108 application, incorporated by reference herein, describes a technique for determining the MRC of a particular thread. As described therein, a cache MRC is constructed based on known cache misses and estimated cache occupancy over a period of time. Each MRC ideally captures the benefits, or lack thereof, of occupying a certain fraction of the cache during the current execution phase of a thread. It is typically the case that as more cache lines are allocated to a particular thread, fewer cache misses (and hence, memory interconnect stalls) will occur because the thread's instructions and data for its current phase of execution are more likely to be found in the cache. If a thread changes its execution phase, or if it loses cache lines due to conflicts with other threads, then an increase in cache misses may be seen, possibly as the predicted cache occupancy rises.

It is also possible to generate miss ratio curves (as opposed to miss rate curve) which express misses per instruction. Miss ratio curves express miss rate in relation to cache occupancy in a manner that is not sensitive to variations in instructions per cycle caused by certain types of microarchitectural contention, such as memory interconnect congestion. A miss rate curve (misses per cycle) can be converted to a miss ratio (misses per instruction) curve by multiplying each datapoint by the cycles per instruction at the corresponding cache occupancy.

As shown in the '108 application, occupancy of each thread is estimated according to Equation 5:

$$O'=O+(1-O/N)*\text{self}-O/N*\text{other} \quad \text{(Eq. 5)}$$

where O' is an updated occupancy for a particular thread, O is the previous occupancy for that thread, N is the number of cache lines in the LLC, "self" is the number of misses caused by the particular thread, and "other" is the number of misses caused by other threads. In one embodiment, each core updates the cache occupancy estimate for its currently-running thread every two milliseconds, using Equation 5. A high-precision timer callback reads hardware performance counters to obtain the number of LLC cache misses for both the local core and the LLC as a whole since the last update. In addition to this periodic update, occupancy estimates may also be updated whenever a thread is rescheduled, based on the number of intervening cache misses since it last ran.

The occupancy that the thread would achieve without any interference from the other threads can be obtained from Equation 5 by setting "other" to zero, so that:

$$O''=O+(1-O/N)*\text{self} \quad \text{(Eq. 6)}$$

where O" is the new occupancy assuming no interference from other threads. The occupancy values O' and O" may be averaged over the execution interval.

Using an MRC constructed from previous observations of thread execution, the miss rate for O' and O" can be determined as M(O') and M(O"), respectively. MRCs may be generated based on passive monitoring, wherein the miss rate observations are plotted as they occur. It is also possible to actively perturb the execution of co-running threads to alter their relative cache occupancies temporarily, to obtain a full MRC. Varying the group of co-running threads scheduled with a particular thread typically causes the particular thread to visit a wider range of occupancy points. In one embodiment, the execution of some cores is dynamically throttled, allowing threads on other cores to increase their occupancies. This may be achieved in some processor architectures using duty-cycle modulation techniques to slow down specific cores dynamically. For example, processors available from Intel Corporation of Santa Clara, Calif. allow system code to specify a multiplier (in discrete units of 12.5%) specifying the fraction of regular cycles during which a core should be halted for the purpose of thermal management. When a core is slowed down, its co-runners (i.e., other cores on the same processor) have an opportunity to increase their occupancy of the LLC, while the occupancy of the thread running on the throttled core is decreased. To limit any potential performance impact, in one embodiment, duty cycle modulation is enabled during less than 2% of execution time, which results in only negligible performance impact caused by cache performance curve generation with duty-cycle modulation.

In one embodiment, occupancy is tracked in discrete units equal to one-eighth of the total cache size, and discrete curves are constructed to bound the space and time complexity of curve generation, while providing sufficient accuracy to be useful in cache-aware CPU scheduling enhancements.

Once the MRC for a thread is known, the time spent by the thread repopulating cache lines evicted by other threads can be calculated by:

$$C=\text{MIN}(q,[\{M(O'')-M(O')\}*q*\Delta]), \quad \text{(Eq. 7)}$$

wherein MIN gives the value to C that is the lesser of q or the expression in square brackets, q is the total execution time of the most recent execution interval, and Δ is an estimated amount of time it takes to repopulate an evicted cache line. The value in curly braces "{ }" represents the extra cache miss-rate incurred by the thread due to interference by other threads, and the value in square braces "[ ]" represents the CPU time taken by the client to repopulate cache lines evicted by other threads. The MIN operator is used to prevent the compensation value C from being greater than q, because the effective CPU time, that is the total execution time minus the time spent repopulating threads, should be greater than zero.

For the alternative embodiment wherein offending threads are penalized, rather than compensating victim threads, the penalty value P in Equation 4 may be approximated for a particular thread τ based on an estimate of the slowdown that thread τ inflicts on all other co-running threads. For example, the penalty amount P for thread $\tau_j$ may be a sum of C values of all other threads. For example for five threads $\tau_1$ to $\tau_5$, $P(\tau_3)=C(\tau_1)+C(\tau_2)+C(\tau_4)+C(\tau_5)$.

When CPU resources are allocated according to a virtual-time based proportional fair scheduling policy as described above, threads are prioritized based on their current virtual time stamps. That is, a queue of threads waiting for CPU resources is ordered such that the thread at the head of the queue has the earliest virtual time stamp. Note that this ordering may be conceptual; i.e., the scheduler could maintain the threads in an unordered list and scan the entire list to find the one with minimum virtual time during a scheduling decision. Sometimes heap data structures, i.e., in the form of a binary tree, are used for priority queues. In these structures, the top-most element of the heap maintains the highest priority element, which in this case would be the thread with the earliest virtual time. Ordinarily, virtual time updates are applied to threads as in Equation 1 at each scheduling point, e.g., when the current thread is descheduled due to blocking or consuming its entire timeslice.

As described above with reference to Equation 3, a thread's virtual timestamp may be altered to increase its scheduling priority by a function of the amount of cache interference it experiences due to conflicts with other threads. In this manner, the thread's scheduling priority is adjusted to compensate for delays caused by microarchitectural contention. In one embodiment, the thread is compensated for all cache misses caused by occupancy of other threads. In other words, the policy assumes that a thread should otherwise be allowed to consume an entire LLC in the absence of competition for cache lines from other threads. In one embodiment, Equation 2 can be used to substitute for e in Equation 3 so that the virtual time for a particular thread is compensated for the value C, which, as defined by Equation 7, is the time spent repopulating cache lines evicted by other threads, as follows:

$$v' = v + \frac{q-C}{w} \quad \text{(Eq. 8)}$$

Substituting for C from Equation 7 gives:

$$v' = v + \frac{q - \text{MIN}(q, [q, [\{M(o'') - M(o')\} * q * \Delta])}{w} \quad \text{(Eq. 9)}$$

Equation 9 therefore represents, in a single algorithm, a method of updating a virtual time of a victim thread to compensate the victim thread for an estimated time spent repopulating cache lines evicted by other threads. This estimated time is determined by estimating the increased miss rate resulting from a reduction of occupancy, resulting from co-running threads that share the LLC with the victim thread. As mentioned previously, other mechanisms for thread compensation can be envisioned. In one embodiment, rather than compensating victim threads, the offending threads are penalized by an amount corresponding to the slowdown they inflict on all other co-running threads. In yet another embodiment, threads may be compensated or penalized using a proportional fair resource allocation algorithm other than one that is based on the notion of virtual time. An example of such an alternative proportional fair algorithm may be the lottery scheduling algorithm described by Waldspurger et al. in the paper previously incorporated by reference. Although this method is presented above as a means to distribute CPU time to threads, the same proportional fair framework can accommodate other abstractions of resource consumers, such as processes, applications, VCPUs, or VMs.

Figure 5:
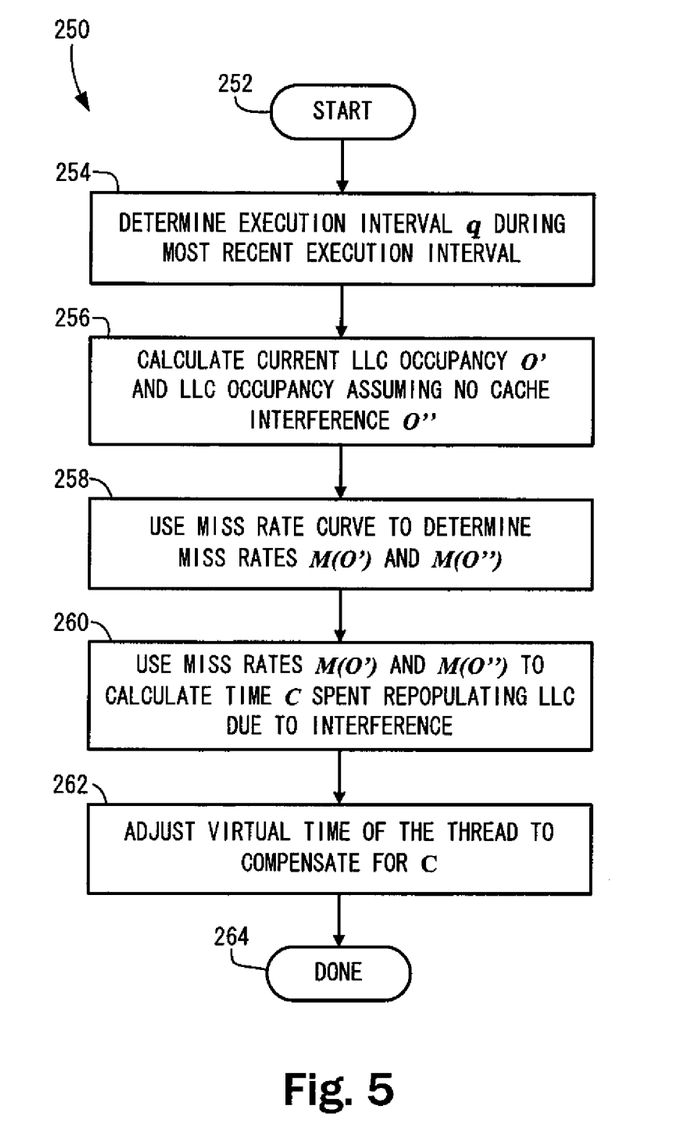
FIG. 5 shows a flowchart illustrating by way of example a procedure for compensating a thread for cache interference caused by other threads that share the same last-level cache.

FIG. 5 shows a flowchart 250 illustrating by way of example a procedure for compensating a thread for cache interference caused by other threads that share the same LLC. The procedure starts as indicated by start block 252 and flows to operation 254 wherein the execution time for the recently completed execution interval for a particular thread is determined. Execution time may be determined by reading the hardware time stamp counter when the thread starts running on a PCPU and reading it again when the thread is descheduled and the virtual time v is being updated.

In operation 256, the current occupancy of the LLC (O') and the current occupancy of the LLC assuming no cache interference from other threads (O") are calculated using Equations 5 and 6 above, respectively. Then, in operation 258, the MRC for the thread is used to translate the occupancy values O' and O" to corresponding miss rates M(O') and M(O"). The MRC may be constructed during previous observations of the thread, e.g., as described in the '108 application.

In operation 260, the miss rates are used to calculate the time C according to Equation 7, and then in operation 262, the virtual time for the thread is updated according to Equation 8. After virtual time is updated, the procedure ends as indicated by done block 264.

The method presented above with reference to FIG. 5 calculates the effective CPU time by taking total CPU time and subtracting the time spent repopulating evicted cache lines for affected threads, according to Equation 2. In an alternate embodiment, the effective CPU time is given by:

$$e = q^*(\text{ideal CPI/current CPI}) \quad \text{(Eq. 10)}$$

wherein e is the effective CPU time, q is the total CPU time, i.e., the time spent executing in the most recent execution interval, the ideal CPI is the average number of cycles (clock ticks) that would elapse for each instruction if there were no cache interference or memory interconnect contention, and the current CPI is the average number of cycles (clock ticks) that elapsed for each instruction executed during the most recent execution interval. Equation 10 therefore takes into account not just the time required to repopulate cache lines evicted from the LLC by other threads, but also time spent waiting for the memory interconnect to become available when memory interconnect contention becomes an issue, as described above with reference to FIG. 4.

The current CPI is calculated by subtracting the real time at the beginning of the execution interval from the ending real time and dividing that value by the number of instructions retired over the course of the execution interval. On x86 processors, a measurement of real-time can be obtained using the RDTSC (read timestamp counter) instruction; the x86 TSC (time stamp counter) increments on every clock cycle.

The number of instructions retired can be obtained using hardware performance counters of the microprocessor in a known manner.

The ideal CPI can be inferred by tracking the number of cycles (clock ticks) elapsed (using time stamps as described above) and instructions retired when the thread is running at full occupancy. However, since a thread might not get to run at full occupancy due to cache contention by other cores on the shared LLC, a technique referred to as "duty cycle modulation" may be used to occasionally throttle each core's effective frequency to reduce its rate of cache access, thereby allowing threads running on other cores to operate at close to full occupancy. The cycles per instruction at full occupancy can then be directly measured or inferred based on the actual (almost, but not quite full occupancy) and performance counter information indicating the number of instructions retired during a measurement interval. In one embodiment, this test is performed once every 40 milliseconds for 4 milliseconds.

The values of ideal CPI and current CPI could easily be replaced with their inverses, i.e., instructions per cycle (IPC), and Equation 10 modified by inverting the fraction to give:

$$e = q^*(\text{current IPC/ideal IPC}) \quad (\text{Eq. 11})$$

which is equivalent to Equation 10. Conceptually, the effective CPU time is being defined as the actual execution time, q, times a value representative of the reduction of speed of execution of the thread attributable to any effect caused by other threads sharing the same cache. The value takes into account not only cache contention, but all sources of contention, including any other shared microarchitectural resources, including memory interconnect bandwidth. The value is known to be accurate because the ideal CPI is updated periodically by testing the speed of execution of the thread at full occupancy of the cache. The speed at full occupancy may be obtained or inferred as described above by periodically stalling or throttling other cores. Once the effective CPU time is known, the virtual time for the thread can be updated using the effective CPU time as shown in Equation 3, or Equation 10 may be combined with Equation 2 to give:

$$v' = v + q^*(\text{ideal CPI/current CPI})/w \quad (\text{Eq. 12})$$

Figure 6:
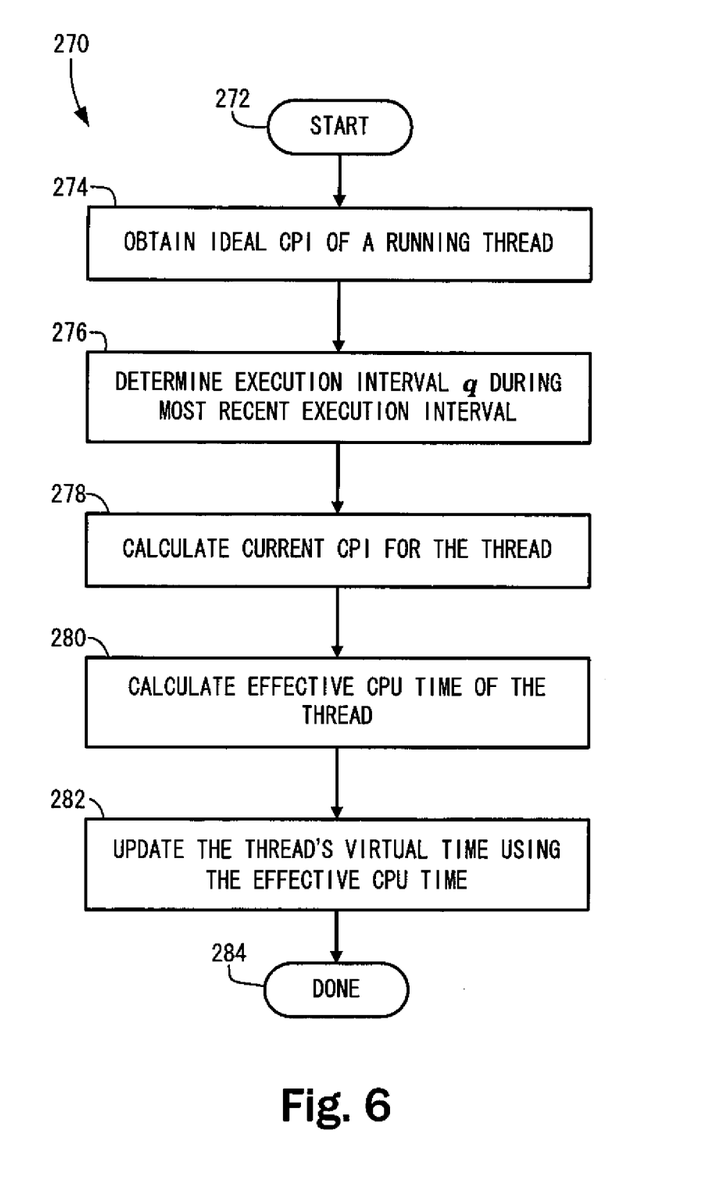
FIG. 6 shows a flowchart illustrating by way of example a procedure for compensating a thread for cache and memory bandwidth interference using effective CPU time calculated as a function of the ideal cycles per instruction and current cycles per instruction.

FIG. 7 shows a flowchart 270 illustrating by way of example a procedure for updating the virtual time of a thread using effective CPU time calculated as a function of the ideal CPI and current CPI. The procedure begins as indicated at start block 272 and flows to operation 274 wherein the ideal CPI for a particular thread is obtained. The idea CPI can be obtained by periodically throttling the execution of other threads that share the LLC, allowing the particular thread to reach close to full occupancy of the cache, and then measuring the performance of the thread at that time. In one embodiment, the ideal CPI is tested about every 40 milliseconds for about 4 milliseconds.

In operation 276, when the particular thread is descheduled, CPU time (q) in real time is determined for the execution interval. In one embodiment, the execution interval is determined as described above by comparing real time stamp counters when the thread is dispatched from the ready queue and when it is descheduled. In x86 architectures the RDTSC (read timestamp counter) instruction may be used.

In operation 278, the current CPI for the thread is calculated. The current CPI is calculated as the CPU time q divided by the number of instructions retired during the previous execution interval. The number of instructions is easily determined using hardware performance counters provided by the PCPU. Specifically, the current performance counter value is compared with a previous performance counter value to obtain the number of instructions retired since the previous deschedule event.

In operation 280, the effective CPU time is calculated as a function of q (the actual CPU time) and a value that represents the reduction of speed of execution of the thread attributable to effects of other threads sharing the same LLC. For example, the effective CPU time may be calculated according to Equation 10.

In operation 282, the virtual time of the particular thread is updated using the effective CPU time determined in operation 280, e.g., using Equation 3. The procedure then ends as indicated by done block 284.

For CPU resources that are allocated according to a proportional fair scheduling policy based on virtual time, threads are prioritized based on their virtual time stamps. By updating threads' virtual times using effective CPU time rather than actual CPU time as described above, ordinary thread scheduling algorithms will then automatically compensate threads that are unfairly impacted by other threads sharing the same LLC (or penalize offending threads in a similar manner). For example, a queue of threads waiting for CPU resources is ordered such that the thread at the head of the queue has the earliest virtual timestamp. Ordinarily, virtual time updates are applied to threads as in Equation 1 above, at each scheduling point, e.g., when the current thread is descheduled due to blocking or consuming its entire timeslice. However, by instead updating the thread's virtual time using the thread's effective CPU time as described above and shown in FIG. 3, the threads unfairly impacted by LLC contention and/or other effects such as memory bus or interconnect contention will have their virtual times reduced, and therefore will be (or might be) scheduled earlier than it would otherwise be scheduled. The methods described above may be implemented for each, or a subset of, the threads executing in the computer system.

Alternative mechanisms, aside from adjusting a thread's virtual time stamp, for compensating, or penalizing, a particular thread based on the effective CPU time of that thread or other threads, are envisioned. Just by way of example, the lottery scheduling approach previously described includes a mechanism, i.e., compensation tickets, for rewarding or penalizing threads to compensate a thread for not consuming all of its allocated quantum of resources. In the lottery scheduling approach, one may use negative compensation tickets (to reduce the thread's probability of being selected) thereby effectively penalizing a thread. A similar compensation strategy may be implemented to compensate (or penalize) based on the thread's effective CPU time.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for scheduling a plurality of resource consumers executing on a computer system having at least one processor core, a last-level cache (LLC) proximate to the at least one processor core, and a main memory, the method comprising:
at each descheduling event of one resource consumer of the plurality of resources consumers following an execution interval that represents a period of time during which the one resource consumer is executed on one of the at least one processor core between scheduling events,
estimating time during the execution interval that was spent repopulating cache line misses evicted from the LLC by the other resources as the lesser of the execution interval or a product of a number of misses during the execution interval caused by cache lines being evicted from the LLC by the other resource consumers, an estimated amount of time to repopulate one evicted cache line, and the execution interval, and
determining an effective central processing unit (CPU) time as an estimated portion of the execution interval that excludes the estimated time; and
compensating the one resource consumer for contention of microarchitectural resources by prioritizing scheduling of the one resource consumer based in part on the effective CPU time for the one resource consumer and executing the resource consumers on the at least one processor core in accordance with the scheduling.

2. The method of claim 1, wherein:
the LLC being a high speed memory area proximate to the at least one processor core that temporarily stores a copy of data retrieved from the main memory by any of the at least one processor core;
each of the resource consumers, including the one resource consumer and the other resource consumers, comprises a thread; and
the delays include time spent repopulating lines from the LLC that were evicted by the other resource consumers.

3. The method of claim 1, wherein the compensating comprises updating a virtual time for the one resource consumer based on the effective CPU time.

4. The method of claim 1, wherein the compensating comprises updating virtual times of the other resource consumers, the updating causing scheduling priorities of the other resource consumers to be reduced, the virtual times of the other resource consumers being updated by an amount based on the effective CPU time of the one resource consumer.

5. The method of claim 1, wherein the LLC being a high speed memory area proximate to the at least one processor core that temporarily stores a copy of data retrieved from the main memory and the determining of the effective CPU time includes:
determining the execution interval;
estimating time during the execution interval that was spent repopulating the cache lines evicted from the LLC by the other resource consumers; and
subtracting estimated time from the execution interval.

6. The method of claim 1, wherein the estimating time during the execution interval that was spent repopulating the cache lines evicted from the LLC by the other resource consumers comprises:
identifying a miss rate, the miss rate being a value representing a number of cache line misses per unit time during the execution interval;

identifying a non-interference miss rate, the non-interference miss rate being a value representing an expected number of cache line misses that would occur had there been no cache lines evicted by the other resource consumers;

from the miss rate and the non-interference miss rate, calculating the number of misses during the execution interval caused by cache lines being evicted from the LLC by the other resource consumers; and multiplying the number of misses by the estimated amount of time required to repopulate one evicted cache line and the execution interval to generate the estimated time.

7. The method of claim 6, wherein the identifying of the miss rate and the non-interference miss rate comprises, accessing data representative of a miss rate curve for the one resource consumer, the miss rate curve relating an rate of occupancy of the LLC to a miss rate, the miss rate curve being constructed from observations of the one resource consumer during execution of the one resource consumer.

8. The method of claim 7, wherein the estimating of the time during the execution interval that was spent repopulating the cache lines evicted from the LLC by the other resource consumers comprises solving the formula $$C=\{M(O'')-M(O')\}*q*\Delta,$$

for C, wherein C is the time during the execution interval that was spent repopulating the cache lines evicted from the LLC by the other resource consumers, M(O') is the miss rate based on an occupancy of the cache expressed in misses per unit time, M(O'') is the non-interference miss rate based on an expected occupancy if there were no interference from the other resource consumers expressed in misses per unit time, q is the execution interval expressed as a measure of real time, and $\Delta$ is an estimated amount of time required to repopulate one evicted cache line.

9. The method of claim 8, wherein C is set equal to the lesser of q or $\{M(O'')-M(O')\}*q*\Delta$.

10. The method of claim 3, wherein the virtual time is updated by the expression:

$$v'=v+e/w$$

wherein v' is the updated value of the virtual time for the one resource consumer, v is the previous value of the virtual time for the one resource consumer, e is the effective CPU time, and w is a relative weight assigned to the one resource consumer.

11. The method of claim 1, wherein the determining of the effective CPU time comprises:

obtaining a first value representing ideal processing speed of the one resource consumer, the ideal processing speed being indicative of a rate of retirement of instructions per unit time absent any contention for computer resources by the other resource consumers, determining a second value representing current processing speed of the one resource consumer, the current processing speed being indicative of a rate of instruction processing per unit time, and wherein the effective time is calculated from a combination of a ratio between the first and second values and the execution interval.

12. The method of claim 11, wherein the effective time is calculated using a formula $$e=q*(\text{ideal CPI/current CPI}),$$

wherein e is the effective CPU time, q is the execution interval, ideal CPI is the first value expressed as cycles per instruction retired, and current CPI is the second value, expressed as cycles per instruction retired.

13. A non-transitory computer readable storage medium having instructions causing a computer system to implement a method for compensating a thread executing on the computer system having at least one processor core, a last level cache (LLC), and a main memory, the LLC being a high speed memory area proximate the processor that temporarily stores a copy of memory retrieved from the main memory, the method comprising:

at each descheduling event of the thread following an execution interval, determining an effective central processing unit (CPU) time, the execution interval being processor core between scheduling events and the effective CPU time being an estimated portion of the execution interval that excludes delays caused by contention for microarchitectural resources, the delays calculated as the lesser of the execution interval or a product of a number of misses during the execution interval caused by cache lines being evicted from the LLC by the other threads, an estimated amount of time to repopulate cache lines evicted by other threads, and the execution interval; and compensating the thread for contention of microarchitectural resources by prioritizing scheduling of the thread based in part on the effective CPU time for the thread and executing the threads on the at least one processor core in accordance with the scheduling.

14. The machine readable storage medium of claim 13, wherein the determining of the effective CPU time includes:

determining the execution interval;

estimating time during the execution interval that was spent repopulating the cache lines evicted from the LLC by other threads; and subtracting estimated time from the execution interval.

15. The machine readable storage medium of claim 13, wherein the estimating of the time during the execution interval that was spent repopulating the cache lines evicted from the LLC by other threads comprises:

identifying a miss rate, the miss rate being a value representing a number of cache line misses per unit time during the execution interval;

identifying a non-interference miss rate, the non-interference miss rate being a value representing an expected number of cache line misses that would occur had there been no cache lines evicted by other threads;

from the miss rate and the non-interference miss rate, calculating the number of misses during the execution interval caused by cache lines being evicted from the LLC by other threads; and;

multiplying the number of misses by the estimated amount of time required to repopulate one evicted cache line and the execution interval to generate the estimated time.

16. The machine readable storage medium of claim 15, wherein the identifying of the miss rate and the non-interference miss rate comprises, accessing data representative of a miss rate curve for the thread, the miss rate curve relating an rate of occupancy of the LLC to a miss rate, the miss rate curve being constructed from observations of the thread during execution of the thread.

17. The machine readable storage medium of claim 16, wherein the estimating of the time during the execution interval that was spent repopulating the cache lines evicted from the LLC by other threads comprises solving the formula $$C=\{M(O'')-M(O')\}*q*\Delta,$$

for C, wherein C is the time during the execution interval that was spent repopulating the cache lines evicted from the LLC by other threads, M(O') is the miss rate based on an occupancy of the cache expressed in misses per unit time, M(O") is the non-interference miss rate based on an expected occupancy if there were no interference from other threads expressed in misses per unit time, q is the execution interval expressed as a measure of real time, and Δ is an estimated amount of time required to repopulate one evicted cache line.

18. The machine readable storage medium of claim 17, wherein the formula is C is set equal to the lesser of q or $\{M(O")-M(O')\}*q*\Delta$.

19. The machine readable storage medium of claim 13, wherein the compensating comprises updating a virtual time for the thread, wherein the updating is based on the effective CPU time.

20. The machine readable storage medium of claim 19, wherein the virtual time is updated by the expression:

$$v'=v+e/w$$

wherein v' is the updated value of the virtual time for the thread, v is the previous value of the virtual time for the thread, e is the effective CPU time, and w is a relative weight assigned to the thread.

21. The machine readable storage medium of claim 13, wherein the determining of the effective CPU time comprises:
obtaining a first value representing ideal processing speed of the thread, the ideal processing speed being indicative of a rate of retirement of instructions per unit time absent any contention for computer resources by other threads,
determining a second value representing current processing speed of the thread, the current processing speed being indicative of a rate of instruction processing per unit time, and
wherein the effective time is calculated from a combination of a ratio between the first and second values and the execution interval.

22. The machine readable storage medium of claim 21, wherein the effective time is calculated using a formula $$e=q*(\text{ideal CPI/current CPI}),$$

wherein e is the effective CPU time, q is the execution interval, ideal CPI is the first value expressed as cycles per instruction retired, and current CPI is the second value, expressed as cycles per instruction retired.

23. The method of claim 13, wherein the compensating comprises updating virtual times of other threads that share the LLC with the thread, the updating causing scheduling priorities of the other threads to be reduced, the virtual times of the other threads being updated by an amount based on the effective CPU time of the thread.

24. A non-transitory computer readable storage medium having instructions causing a computer system to implement a method for scheduling a plurality of resource consumers executing on a computer system having at least one processor core, a last level cache (LLC) proximate to the at least one processor core, and a main memory, the method comprising:
at each descheduling event of one resource consumer following an execution interval, that represents a period of time during which the one resource consumer is executed on one of the at least one processor core between scheduling events,
estimating time during the execution interval that was spent repopulating cache line misses evicted from the LLC by the other resources as the lesser of the execution interval or a product of a number of misses during the execution interval caused by cache lines being evicted from the LLC by the other resource consumers, an estimated amount of time to repopulate one evicted cache line, and the execution interval, and
determining an effective CPU time as an estimated portion of the execution interval that excludes the estimated time; and
compensating the one resource consumer for contention of microarchitectural resources by prioritizing scheduling of the one resource consumer based in part on the effective CPU time for the one resource consumer and executing the resource consumers on the at least one processor core in accordance with the scheduling.

25. The machine readable storage medium of claim 24, wherein the compensating comprises updating a virtual time for the one resource consumer based on the effective CPU time.

26. The machine readable storage medium of claim 24, wherein the LLC being a high speed memory area proximate the at least one processor core that temporarily stores a copy of data retrieved from the main memory and the determining of the effective CPU time includes:
determining the execution interval;
estimating time during the execution interval that was spent repopulating the cache lines evicted from the LLC by the other resource consumers; and
subtracting estimated time from the execution interval.

27. The machine readable storage medium of claim 24, wherein the determining of the effective CPU time comprises:
obtaining a first value representing ideal processing speed of the one resource consumer, the ideal processing speed being indicative of a rate of retirement of instructions per unit time absent any contention for computer resources by the other resource consumers,
determining a second value representing current processing speed of the one resource consumer, the current processing speed being indicative of a rate of instruction processing per unit time, and
wherein the effective time is calculated from a combination of a ratio between the first and second values and the execution interval.

28. The machine readable storage medium of claim 24, wherein each resource consumer comprises a virtual machine having one or more virtual processors that is running by way of virtualization software on the computer system, the method being carried out by a component of the virtualization software.

* * * * *